Oct. 1, 1968 — R. Q. ARMINGTON — 3,403,793
POSITION SENSING DEVICE
Filed Dec. 17, 1965 — 5 Sheets-Sheet 2

INVENTOR
RAYMOND Q. ARMINGTON
Baldwin, Doran & Egan
ATTORNEYS

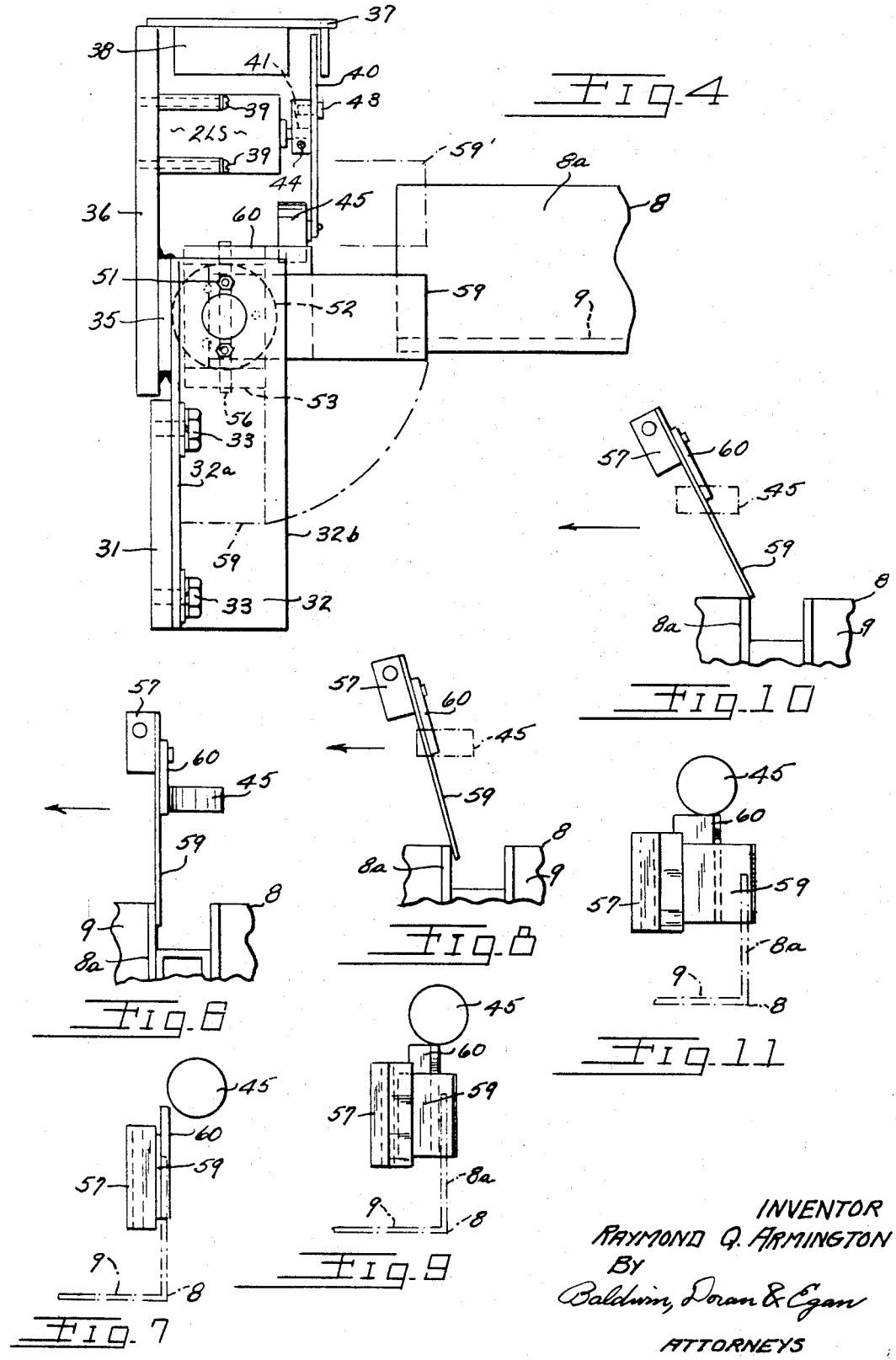

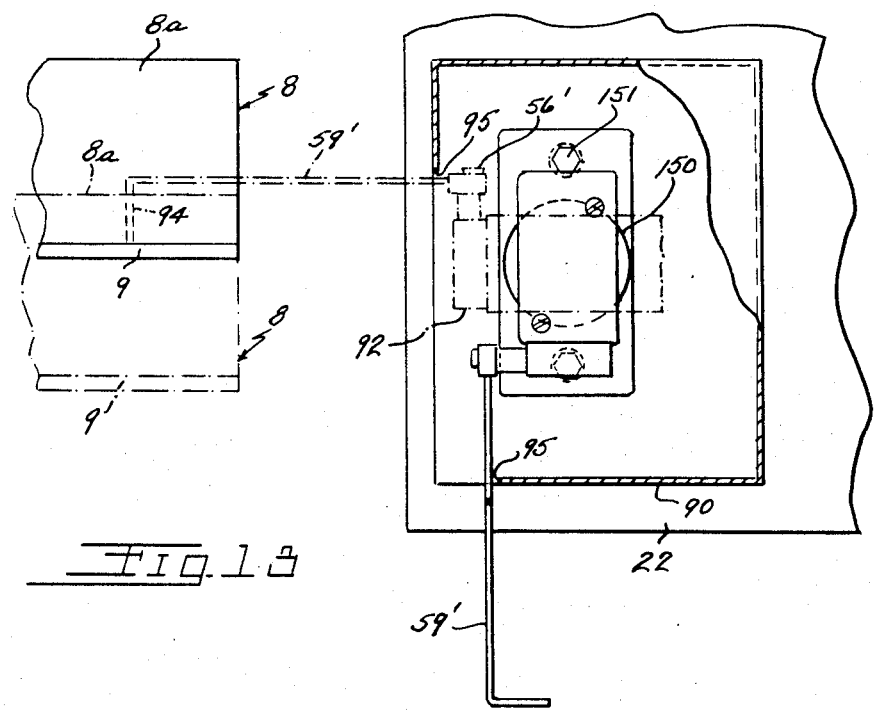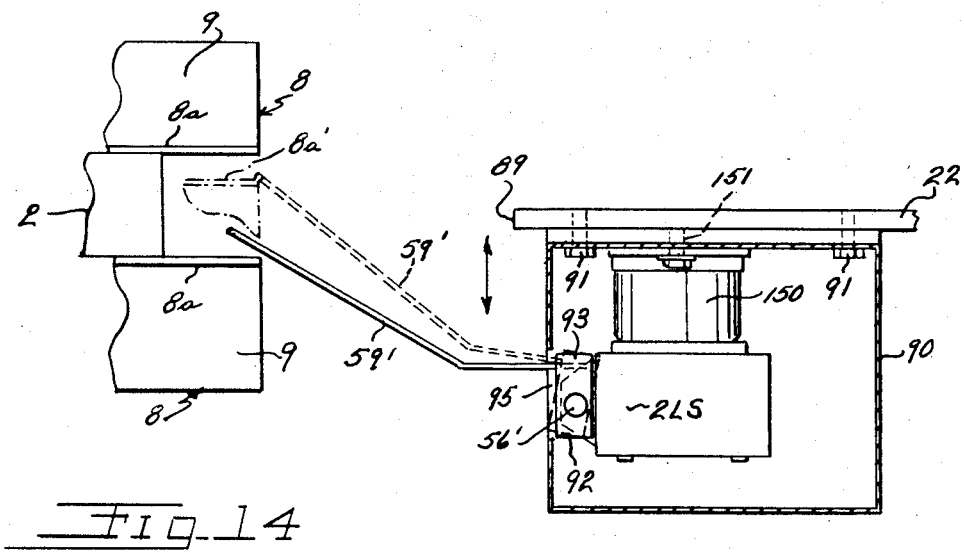

United States Patent Office 3,403,793
Patented Oct. 1, 1968

3,403,793
POSITION SENSING DEVICE
Raymond Q. Armington, Willoughby, Ohio, assignor to The Triax Company, Cleveland, Ohio, a corporation of Ohio
Filed Dec. 17, 1965, Ser. No. 514,614
12 Claims. (Cl. 214—16.4)

ABSTRACT OF THE DISCLOSURE

In a warehouse having horizontal and vertical spaced supports for stored loads, a load carrier including a transversely extendible extractor which is movable vertically and horizontally to said supports, the carrier having a stop switch thereon movable relative to the carrier into an operative position for engagement with a portion of the support for stopping the carrier and initiating movement of the extractor.

---

This invention relates to a position sensing device for stopping the movement of a powered carrier or the like at a precise position relative to a fixed structure.

The invention is particularly applicable to an automatic warehousing system having a control means for routing a mechanized load carrier to a selected load storage location and stopping the carrier thereat without direct manual control by an operator. An exemplary warehousing system of the type referred to and automatic control means therefor are fully disclosed in assignee's following copending applications: Automatic Warehousing System, Ser. No. 373,803, filed June 9, 1964, and now abandoned and Electrical Control Circuit for An Automatic Warehousing System, Ser. No. 418,048, filed Dec. 14, 1964.

In general, the exemplary warehousing system referred to comprises a storage structure having vertically spaced load storage openings disposed in bays along either side of an aisle, said system including a mechanized carrier for moving horizontally and vertically in the aisle and transferring loads laterally between the carrier and one of the load storage openings. The load storage positions are defined by pairs of elongated ledge members which are disposed with their longer dimensions transverse to the aisle and with flange portions projecting inwardly from opposite sides of the bays whereby a load can be bridged across each pair for storing said load.

The mechanized carrier of the warehousing system referred to includes a laterally movable load transfer member which is cantilevered laterally into a bay either below the level of a load, for rising under the load and picking it up, or above the level of a pair of said ledge members, for lowering a load onto said ledge members. The result is that the carrier must be capable of being stopped accurately at any given load storage opening in either a low position or a high position.

Generally, it is the object of this invention to provide a unique and improved position sensing device for stopping the movement of a mechanized carrier or the like at a precise position relative to a fixed structure.

More specifically, it is an object of this invention to provide means for accurately stopping the horizontal movement of a load carrier in an automatic warehousing system.

It is another object of the invention to provide, in operative association with the load carrier, a stop switch and a switch actuating means, said switch actuating means being pivotable from a nonactuating to an actuating position upon approach of the carrier to a selected position.

Still another object is to provide, in association with a load carrier movable at fast and slow speeds, a switch actuating means which is responsive to the change from fast to slow speeds, alternatively responsive to other controlled movement of the carrier as it approaches the exact selected position.

Yet another object is to provide a switch actuating means which is operative when the carrier is in both the high and low positions.

A further object is to provide, in operative association with a load carrier having a stop switch, a rotary power means, an actuator carried by the power means and rotatable from a nonactuating to an actuating position, and means carried by the actuator for abutting a portion of a fixed structure when the actuator is in the actuating position whereby said actuator is pivoted into contact with the operative member of said stop switch.

Other objects of the invention and the invention itself are disclosed in the following description of two forms of the invention. Reference is made throughout the description to the accompanying drawings.

FIG. 1 of the drawings is an end view of a storage frame and an automatic carrier therefor.

FIG. 3 is an enlarged elevation of the position sensing device of FIG. 2.

FIG. 4 is a side elevation of the position sensing device as seen from the left side of FIG. 3.

FIG. 6 is a simplified, top plan view of a switch actuator of the sensing device just prior to actuation of the stop switch.

FIG. 7 is an end view as seen from the bottom of FIG. 6.

FIG. 8 is a view similar to FIG. 6 showing the switch actuator in a pivoted position whereby the stop switch is actuated.

FIG. 9 is an end view as seen from the bottom of FIG. 8.

FIG. 10 is a view similar to FIGS. 6 and 8 showing the switch actuator in an overtravel position.

FIG. 11 is an end view as seen from the bottom of FIG. 10.

FIG. 13 is a fragmental side elevational view of a second embodiment of the device taken from the position similar to FIG. 4.

FIG. 14 is a top plan view of the device of FIG. 13 with the actuator arm in its horizontal position and showing the switch actuating movement in the broken line position of that arm.

Figure 1:
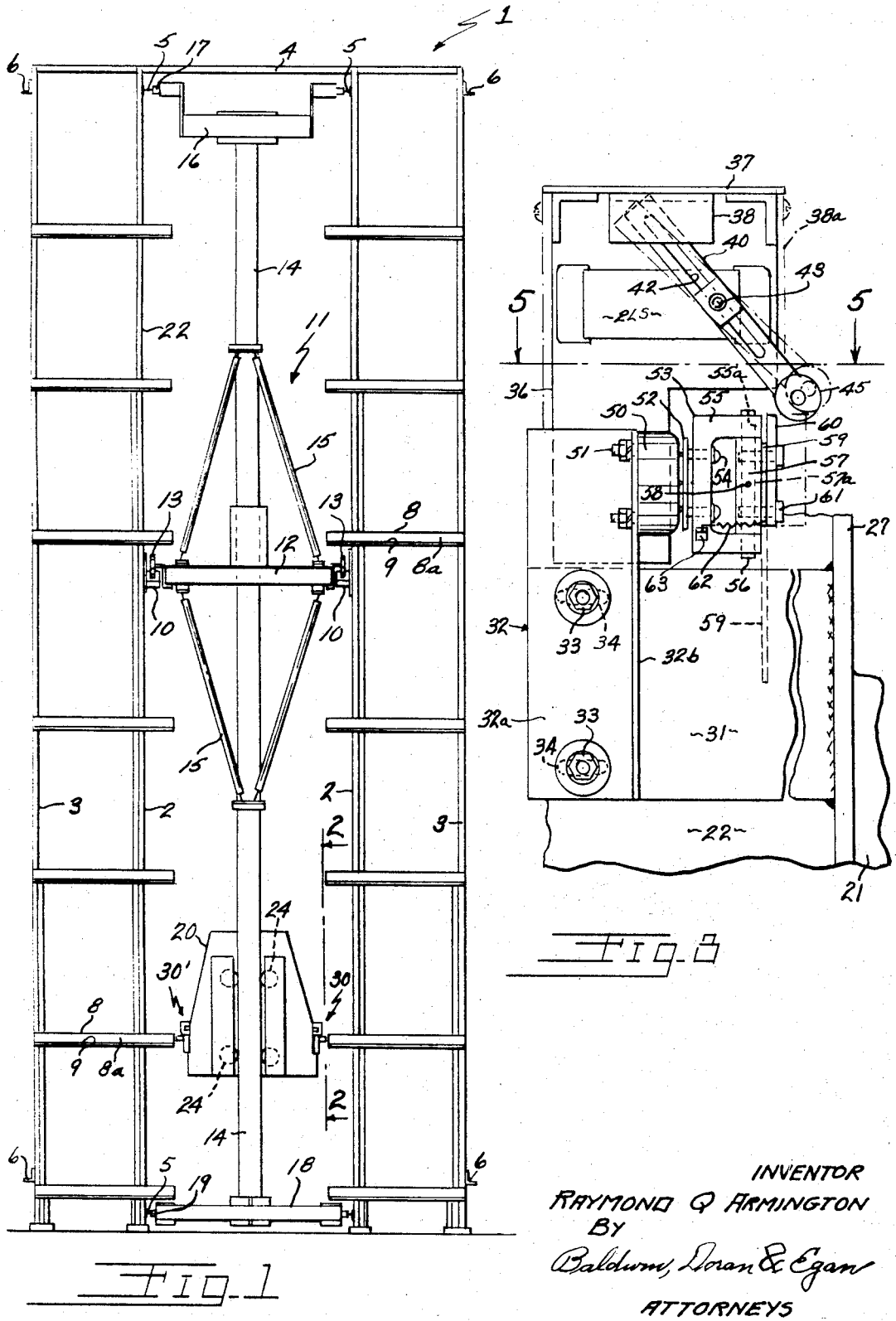
Figure 2:
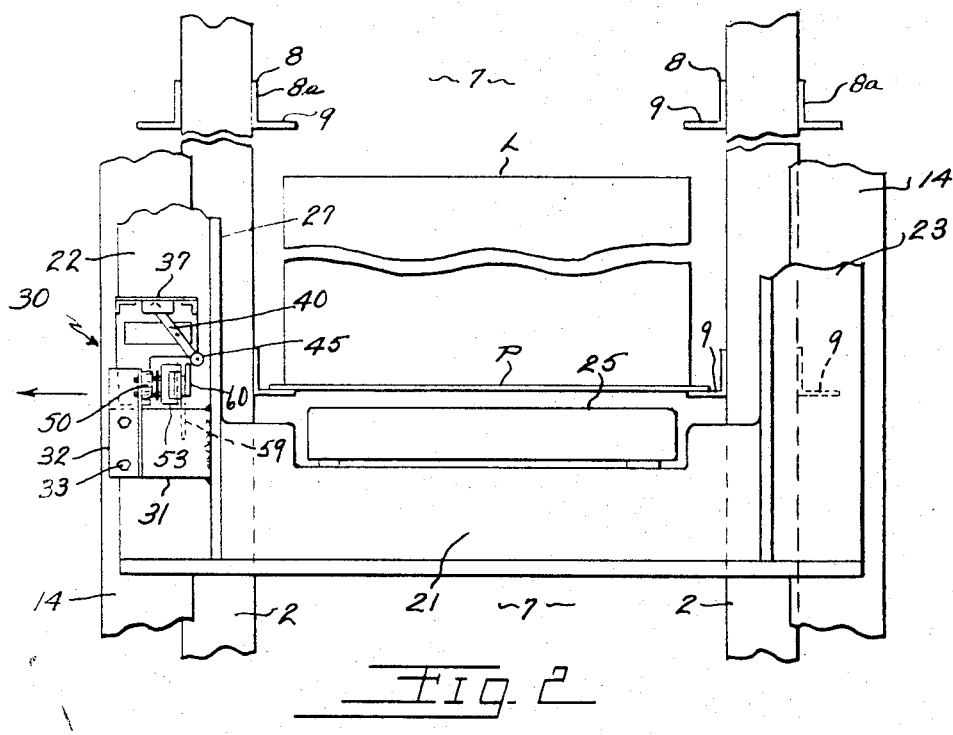
FIG. 2 is a side elevation of an elevator of the carrier as seen from the line 2—2 of FIG. 1, the position sensing device of this invention being shown mounted to the elevator.

Referring now to the drawings and particularly to FIGS. 1 and 2, a warehousing system to which the present invention may be applied comprises a storage frame generally indicated at 1 constructed of relatively thin, elongated structural members of any suitable cross-section such as angle-shaped, U-shaped or rectangular. Said storage frame comprises parallel, laterally spaced rows of inner or aisle posts 2 flanked by parallel rows of outer posts 3. Transversely aligned rows of aisle and outer posts 2 and 3 are connected together across the aisle by cross members 4 whereas all of the posts in the rows of aisle and outer posts are connected together by longitudinal stringers 5 and 6 respectively. The inner or aisle posts 2 define bays 7 along either side of the aisle, and transversely aligned inner and outer posts are connected together at different levels by transversely directed ledge member 8. As herein illustrated, the ledge members 8 are angle-shaped and are arranged in horizontally aligned pairs to provide load support means at different levels in the bays 7, each ledge member 8 having a flange 9 projecting into the adjacent bay for receiving and supporting an edge of a load bridged across the pair of ledge members. A typical load, shown at L, is preferably carried upon a pallet P which said pallet is of such width that the edges thereof engage a pair of horizontally aligned, mutually directed flanges 9 for storing the load.

The rows of aisle posts 2 carry U-shaped tracks 10 which extend the entire length of the storage frame 1 and which support a load carrier which is generally indicated at 11. The tracks 10 are disposed intermediate the top and bottom of the storage frame 1, and the load carrier 11 has a generally rectangular carriage 12 having wheels 13 at the corners thereof engaging said tracks. By means of the carriage 12, the load carrier 11 is movable horizontally along the entire length of the storage frame aisle, horizontally past the bays 7.

The carriage 12 carries a pair of parallel masts 14 which are vertically disposed and are spaced from each other in the direction of the storage frame aisle. Diagonal braces 15 connect the masts 14 to the carriage 12 to stabilize said masts and keep them as nearly vertical as possible. The upper ends of the mast 14 are connected together by an upper frame structure 16 which carries rollers 17 for engaging upper stringers 5 and thereby stabilizing the upper ends of said masts. A lower frame structure 18 is carried at the bottom of the masts 14, said lower frame structure having rollers 19 which engage lower stringers 5 to stabilize the lower ends of said masts.

The masts 14 provide vertical track means for an elevator 20 which is movable vertically to the different levels of the storage openings as defined by the ledge members 8. Said elevator comprises a horizontal base 21, which is disposed between the masts 14, and upstanding end weldments 22 and 23 which partially embrace said masts and which carry rollers 24 for engaging the sides of said masts to guide and stabilize the elevator.

The elevator 20 is power driven vertically along the masts 14 by any well-known means such as chain and overhead motor pulley means as fully disclosed in assignee's copending application, Automatic Warehousing System. Similarly, the carriage 12 is driven along the track 10 by any suitable drive means, an example of such drive means being fully disclosed in the same copending application.

Referring now particularly to FIG. 2, the elevator 20 is provided with a horizontally disposed, transversely extendible extractor 25 which is mounted within a recess 26 of the base 21. Said extractor is laterally extendible into the bays 7 on either side of the storage frame aisle for transferring loads between the elevator 20 and any selected load storage level. Said extractor may be mounted for lateral movement in any suitable manner, details of one such construction being clearly disclosed in the above referred to copending application, Automatic Warehousing System.

The extractor 25, in operation, is cantilevered outwardly into a bay 7 either slightly below or slightly above a pair of flanges 9 of the ledge members 8. Said extractor is narrower than the distance between a pair of flanges 9, as clearly shown in FIG. 2, whereby said extractor can be moved vertically between said flanges. In FIG. 2, the extractor 25 is shown in the low position whereby it can be cantilevered laterally beneath a load L which is already bridged across a pair of cooperant flanges 9 by means of a pallet P. With the extractor in the extended position, the elevator is then raised slightly whereby said extractor passes upwardly between the flanges and lifts the load L and the pallet P clear of the flanges 9. Subsequent retraction of the extractor then moves the load from the bay into the aisle and onto the elevator 20. If the load carrier 11 is delivering a load to be stored in the storage frame 1, the load will already be positioned upon the extractor 25 and the elevator is raised to a level whereby said extractor and the load are disposed slightly above a pair of flanges 9 at the desired load level. The extractor is then caused to extend laterally whereby the load carrying pallet P is poised with its side edge portions disposed just above the flanges 9. The elevator 20 is then lowered thereby depositing the pallet P and its load L upon said flanges after which the empty extractor, now in the low position, is returned to the elevator 20.

From the foregoing, it will be readily understood that the horizontal motion of the load carrier 11 must be accurately stopped at a selected pair of cooperant ledge members 8 both when the extractor and elevator are in a high position and when they are in a relatively low position. The reference points for determining the exact stopping position relative to the load storage openings comprise end portions of ledge members 8 which, it will be noted, project into the storage frame aisle a short distance beyond the inner or aisle posts 2. It will be readily understood, however, that any fixed reference member associated with the storage frame could be used, such as a projection member arbitrarily secured to said storage frame for convenience in actuating the position sensing device of this invention.

Figure 5:
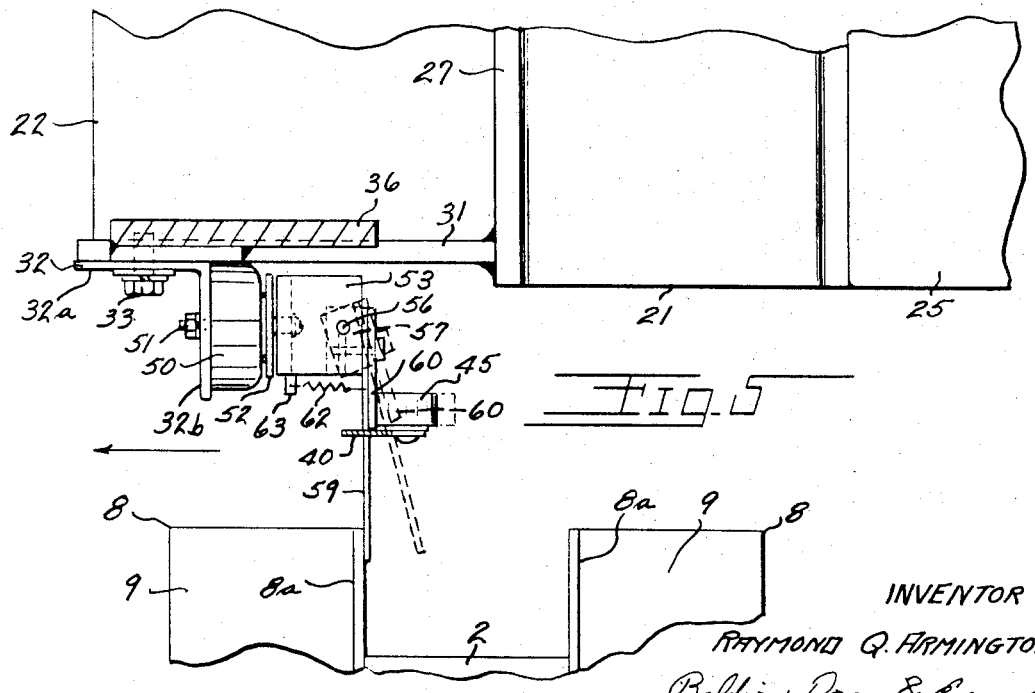
FIG. 5 is a top plan view of the position sensing device.

The position sensing device is generally indicated at 30 in FIG. 2 and is illustrated in detail in FIGS. 3-5. The sensing device illustrated in FIG. 2 is the one shown at the right on the elevator 20 in FIG. 1, as indicated by the viewing line 2—2. It will be readily understood that a similar sensing device indicated at 30' is provided on the left-hand side of the elevator 20 as shown in FIG. 1, said sensing device 30' being merely a mirror image of the sensing device 30. It will also be noted that the sensing device 30 is mounted adjacent to the end weldment 22 of the elevator which constitutes the forward end of the elevator so far as its horizontal movement and stopping along the storage frame aisle is concerned. This forward direction is indicated by the arrow at the left of the position sensing device 30 in FIG. 2. In other words, sensing devices adjacent to the forward end of the elevator are provided on both the right- and left-hand sides of said elevator, but it will be readily understood that similar devices or mirror images thereof may be provided adjacent to the end weldment 23 at the other two corners of the elevator for stopping the horizontal movement of said elevator as it approaches a load storage location while moving in the opposite direction. Only the position sensing device 30 is shown and described in detail, the mirror image or the opposite handed construction of the position sensing device 30' being readily understandable therefrom.

Referring now to FIGS. 2-5, the end weldment 22 includes a side plate 27 which is disposed vertically in a plane at right angles to the direction of the aisle between the base 21 and said end weldment 22, said side plate 27 projecting laterally beyond the end weldment a slight distance. In the embodiment of the invention as herein illustrated and described, the position sensing device 30 is mounted upon a mounting plate 31 which is welded or otherwise suitably attached to the side plate 27 just laterally beyond the end weldment 22. The mounting plate 31 is secured edgewise against the side plate 27 and is disposed in a vertical plane parallel with the direction of the storage frame aisle.

The position sensing device 30 comprises an angle-shaped mounting bracket 32 having relatively right angularly disposed flanges 32a and 32b. The flanges 32a and 32b are disposed in vertical planes, and the flange 32a is secured to the mounting plate 31 by a pair of vertically spaced bolts 33. The bolts 33 are thread fitted into the mounting plate 31 and pass through horizontally elongated slots 34 in the flange 32a whereby the entire position sensing device 30 is horizontally adjustable relative to the elevator 20.

The upper end portion of the mounting bracket 32 projects upwardly above the upper edge of the mounting plate 31, the upwardly projecting portion of the flange 32a carrying, on the side thereof directed toward the end weldment 22, a spacer plate 35 and a limit switch mounting plate 36. The spacer plate 35 is disposed flatwise against the flange 32a, and the limit switch mounting plate 36 is disposed flatwise against the spacer plate 35 and projects a substantial distance upwardly thereabove. In the form shown, the flange, spacer plate, and limit switch mounting plate are all welded together.

The upper edge of the limit switch mounting plate 36 carries a horizontally disposed protector plate 37 which projects laterally outwardly in the direction of the storage frame and which carries a plurality of angle brackets 38 to which may be secured a suitable cover 38a (shown in broken lines) for protecting the sensing device from accidental actuation or foreign matter.

A limit switch 2LS is mounted to the limit switch mounting plate 36 below the protective plate 37 by suitable means such as bolts 39. The limit switch 2LS is of a conventional type having an operative member or arm 40 which is pivotally mounted intermediate the ends thereof upon an operating shaft 41 of the switch. As herein illustrated, the arm 40 comprises an elongated, flat member having an elongated slot 42, running lengthwise thereof, and set screw means 43 whereby said arm is longitudinally adjustable in a conventional manner. The angle of the arm 40, as seen in FIG. 3 is also adjustable in a conventional manner by the set screw means 44 which clearly shows in FIG. 4. As herein illustrated, the arm 40 is disposed at an oblique angle, the lower end of said arm being directed rearwardly or away from the horizontal direction of movement of the elevator 20. The lower end of said arm carries a freely rotatable roller 45. Actuation of the limit switch 2LS, which is adapted to cause the horizontal movement of the load carrier 11 to stop, is effected by counterclockwise rotation of the arm 40 as said arm is viewed in FIGS. 2 and 3.

The upper end portion of the flange 32b of the mounting bracket 32 carries a rotary solenoid 50 which is suitably secured to the flange by bolts 51. The rotary solenoid 50 has an exposed armature portion 52, the axis of said armature portion being disposed horizontally parallel with the direction of the storage frame aisle and at right angles to the transverse axis of the operating shaft 41 of the limit switch 2LS.

The rotary solenoid 50 is disposed below the level of the limit switch 2LS, and the armature portion 52 thereof carries a yoke 53 which is secured thereto by screws 54. The yoke 53 has outwardly projecting arms 55 disposed parallel with the axis of the armature portion 52 which said arms carry the ends of a pin 56 disposed at right angles to said axis. Said yoke 53 is rotatable by the rotary solenoid 50, 90° from a position wherein the pin 56 is horizontal to the position shown in FIG. 4 wherein said pin is vertical. The armature portion 52 of the rotary solenoid 50 is biased in a conventional manner to normally return to the position wherein the pin 56 is horizontal. Therefore, the vertical position of the pivot pin 56, wherein the yoke arms 55 are vertically spaced from each other, represents the position assumed when the rotary solenoid 50 is energized, and the horizontal position of the pivot pin 56, wherein the arms 55 are horizontally spaced from each other, represents a deenergized condition of said rotary solenoid.

The pivot pin 56 is freely rotatable within apertures 55a of the arms 55 and carries a pivot block 57 which is suitably apertured at 57a to receive said pivot pin. The pivot block 57 is disposed between the arms 55 and is secured to the pivot pin 56 by set screw means 58.

The pivot block 57 has attached thereto an elongated, rectangular arm or blade 59 and an actuator plate 60. Bolts 61 secure the blade 59 and the actuator plate 60 to the pivot block 57, and it will be noted that said actuator plate projects upwardly above the blade 59 to a point above the lowermost point on the periphery of the roller 45 of the limit switch arm 40 when the yoke 53 is pivoted to the full line position of FIG. 3. The swing of the blade 59 is, of course, in a vertical plane transverse to the direction of movement of the load carrier 11. FIG. 4 illustrates the full extent of this swing, the broken line position of said blade showing its position when the solenoid 50 is de-energized, and the full position of said blade showing its position when said solenoid is energized.

FIGS. 5–11 illustrate the manner in which the blade 59 and actuator plate 60 are pivoted to actuate the limit switch 2LS. As hereinabove stated, when the rotary solenoid 50 is energized, the yoke 53 and, therefore, the blade 59 are rotated to the full line position shown in FIG. 5. This places the distal end portion of the blade in overlapping relation to the end portions of the ledge members 8 which project in the direction of the storage frame arm. As the load carrier 11 moves horizontally in the direction indicated by the arrow in FIG. 5, the distal end portion of the blade 59 abuts a vertical flange 8a of a ledge member 8 thereby causing counter rotation of the pivot block 57 as seen in FIG. 5. Because of the vertical dimensions of the blade 59 and the vertical flanges 8a, contact is made when the elevator is in both the high and low positions. This is well illustrated in FIG. 4 wherein the full line position of the blade 59 shows its position when the elevator is in the low position, and the broken line position of said blade shows its position when the elevator is in the high position. Relative movement between the elevator 20 and the storage frame 1 causes the actuator plate 60 to move toward the right against and beneath the roller 45 of the arm 40 of the limit switch. This contact causes counter rotation of the arm 40 as viewed in FIG. 3 whereby the limit switch 2LS is actuated and the horizontal motion of the carrier is stopped.

It will be noted in FIG. 5 that the blade 59 abuts a ledge member 8 which is one of a pair of said ledge members which are closely adjacent to each other. These two ledge members illustrated represent a pair of such members which are attached to a single aisle post 2 by means of their vertical flanges 8a. The left-hand ledge member illustrated defines the right-hand edge of a storage position to the left thereof whereas the right-hand ledge member illustrated represents the left-hand edge of a storage position disposed to the right of said last mentioned ledge member. In this particular instance, the extractor 25 is positioned to deposit a load at the right-hand storage position with the position sensing device of this invention sensing off of the adjacent ledge member 8 of the storage position or bay immediately to the left of the one in which a load is to be stored or from which a load is to be picked up.

As illustrated in FIGS. 3 and 5, the blade 59 is biased toward the nonactuating position (clockwise in FIG. 5) by a coil spring 62 which is secured at one end to said blade and at the other end thereof to a small angle bracket 63 which is secured on one side of the yoke 53. The upper end portion of the actuator plate 60 which overlaps the upper arm 55 of the yoke 53 abuts the outer end surface of said arm thereby limiting rotation of the blade 59 in the direction of the small angle bracket 63 (clockwise in FIG. 5) to a point whereby it is disposed substantially at right angles to the direction of travel of the load carrier 11.

FIGS. 6–11 illustrate three positions of the blade 59 and actuator plate 60 with respect to the adjacent reference ledge members 8 and the roller 45 of the limit switch 2LS. FIGS. 6 and 7 illustrate the nonactuating position which is the same as that shown in full line in FIG. 5. In this position, the rotary solenoid 50 has been energized and the blade has been rotated upwardly into a laterally projecting position, but the roller 45 has not yet been moved to cause actuation of the limit switch 2LS. FIGS. 8 and 9 show the blade 59 and the actuator plate 60 pivoted to the point whereby the upper edge portion of said actuator plate has been moved under the roller 45 to cause pivoting of the arm 40 in the counterclockwise direction as shown in FIG. 3 thereby actuating the limit switch 2LS. FIGS. 10 and 11 illustrate the overtravel position representing the slight forward movement which the carrier might make after the moment when the stop switch 2LS is actuated. It will be noted that due to the angular relation between the actuator plate 60 and the lower peripheral edge of the roller 45, said roller does not tend to descend or roll off of the upper edge of said actuator plate even in this slightly overtraveled position.

It will be readily appreciated that the exact stopping position for the load carrier 11 can be made variable within substantial limits due to the horizontal adjustability of the mounting bracket 32, which is afforded by the slots 34 therein, and by the angular position and longitudinal adjustment of the arm 40 of the limit switch 2LS.

Figure 12:
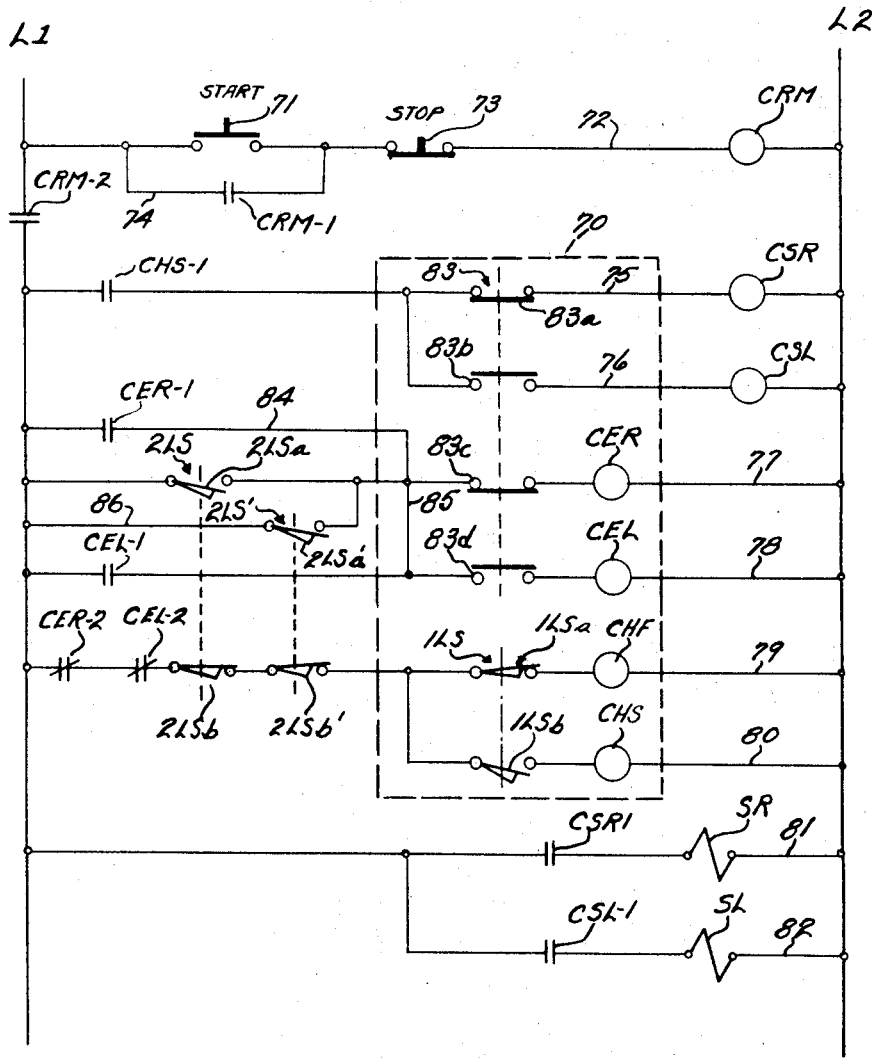
FIG. 12 is an electrical control diagram showing how the position sensing device of this invention is connected into the control means of an automatic warehousing system.

The simplified electrical diagram shown in FIG. 12 illustrates the manner in which the position sensing device of this invention would be used in connection with an automatic warehousing system. The broken line rectangle 70 represents a complete, automatic control means for a warehousing system of the type disclosed herein, an example of such complete control means being fully disclosed in the above referred to copending application, Electrical Control Circuit for Automatic Warehousing System. Only those elements within the fully automatic control means which are necessary to the understanding of the present invention are herein shown; and it will be understood that in the simplified electrical diagram of FIG. 12, each element shown may, in fact, represent a plurality of electrical elements which attain the same ultimate electrical effect but which may, for reasons of providing safety interlocks and the like, be more complicated in a highly sophisticated electrical system.

The electrical diagram of FIG. 12 provides a start switch 71 which is interposed in a line 72 connected across a pair of main leads L1 and L2. A stop switch 73 and a master control relay CRM are connected in series with said start switch, the master relay CRM controlling a pair of normally open contacts CRM–1 disposed in a parallel line 74 around the start switch 71. The master control relay CRM also controls a pair of normally open contacts CRM–2 which are interposed in the lead L1 between the line 72 and all other circuits across the leads whereby upon de-energization of the relay CRM, the remainder of the control circuit is isolated. It will be readily appreciated that when the normally open start switch 71 is momentarily closed, a circuit is formed from the lead L1 through said start switch, the stop switch 73, and master relay CRM to the lead L2. The energized master relay CRM closes the normally open contacts CRM–1 thereby setting up a maintaining circuit which keeps the relay CRM energized even when the start switch 71 is released and returns to its normally open position. At the same time, the normally open contacts CRM–2 are closed and remain closed because the master relay remains energized. It also will be readily appreciated that by momentarily depressing the normally closed stop switch 73, the master relay CRM is de-energized, contacts CRM–1 open whereby the relay remains de-energized, and the contacts CRM–2 return to their normally open position to isolate the rest of the system.

Reading down the electrical diagram of FIG. 12 from the line 72, the following control relays and coils are provided: relay CSR in line 75 for actuating the rotary solenoid on the right-hand side of the elevator 20, coil CSL interposed in a line 76 parallel with the relay CSR for controlling the rotary solenoid on the left-hand side of the elevator, relay CER disposed in a line 77 and adapted to effect movement of the extractor toward the right, relay CEL disposed in a line 78 and adapted to effect movement of the extractor toward the left, relay CHF disposed in a line 79 and adapted to effect fast horizontal movement of the load carrier 11, relay CHS disposed in a line 80 connected in parallel with the relay CHF and adapted to effect slow horizontal movement of the load carrier 11, coil SR disposed in a line 81 and representing the coil of the right-hand rotary solenoid, and coil SL disposed in a line 82 connected in parallel with the coil SR and representing the coil of the rotary solenoid on the left-hand side of the elevator 20. A selector switch 83 has contacts 83a disposed in line 75, contacts 83b disposed in line 76, contacts 83c disposed in line 77, and contacts 83d disposed in line 78. The selector switch is so arranged that when the contacts 83a in line 75 are closed for energization of the relay CSR of the right-hand rotary solenoid, the contacts 83c in line 77 are also closed whereby the relay CER can be energized to cause the extractor to move to the right. Alternatively, the contacts 83b in line 76 and 83d in line 78 may be closed, the contacts 83a and 83c then being open, whereby only the relay CSL controlling the left-hand rotary solenoid will be energized, along with the coil CEL for causing the extractor to move to the left. This insures that the position sensing device of this invention will always sense for the correct position on the side toward which the extractor will move.

The normal running speed of the load carrier 11 is the fast speed which is effected by the coil CHF in line 79. The position sensing device of this invention is not used until after the horizontal movement has been dropped to a slow speed as it makes its final approach to a selected load position. The point at which the drop in speed is made is when the blade 59 of the position sensing device 30 is between two closely adjacent ledge members 8. Referring for a moment to FIG. 5 of the drawings, if the carrier is moving from right to left, the blade 59 of the load sensing device 30 will remain in the down or vertical position until it passes the ledge member 8 shown on the right. After passing the first ledge member, a limit switch 1LS having normally closed contacts 1LSa in line 79 and normally open contacts 1LSb in line 80 is tripped to cause the contacts 1LSa to open and the contacts 1LSb to close. The fast speed relay CHF is thereby de-energized and the slow speed relay CHS is energized to cause the carrier to slow down and at the same time to cause the position sensing device to become active by closing a pair of normally open contacts CHS–1 in line 75 to energize either the relay CSR of the right-hand rotary solenoid or the relay CSL of the left-hand rotary solenoid. The relay CSR or CSL, in turn, closes normally open contacts CSR–1 or CSL–1 in lines 81 or 82, respectively, to energize either the solenoid coil SR or the solenoid coil SL.

The stop switch 2LS has normally open contacts 2LSa in line 77 controlling the extractor right relay CER and normally closed contacts 2LSb in the line 77 controlling the horizontal relays CHF and CHS, depending upon the position of the switch 1LS. It will be understood that a like switch 2LS' is provided for the left-hand position sensing device 30', said switch 2LS' having normally open contacts 2LSa', disposed in a line 86 in parallel with the contacts 2LSa, and normally closed contacts 2LSb', connected in series with the contacts 2LSb.

The extractor relay CER controls a first pair of normally open contacts CER–1 in a line 84 which is connected in parallel around the normally open contacts 2LSa and 2LSa' of the limit switches 2LS and 2LS' respectively. Said relay CER also controls a pair of normally closed contacts CER–2 disposed in the line 79 to the left of the parallel line 80 whereby neither of the relays CHF or CHS for effecting horizontal movement of the carrier can be energized when the extractor is moving to the right. The other extractor relay CE1 controls a first pair of normally open contacts CEL–1 in the line 78 and a second pair of normally closed contacts CE–2 connected in series with the contacts CER–2. A short crossover line 85 connects the lines 77 and 78 between the normally open contacts 2LS*a* and 2LS*a*′ and the selector contacts 83*c* of the selector switch 83.

In operation, the first circuit formed upon depressing the start switch 71 is across the line 79 to energize the relay CHF thereby causing fast horizontal movement of the carrier. This circuit is through the normally closed contacts CER–2, normally closed contacts CEL–2, normally closed contacts 2LS*b*, normally closed contacts 2LS*b*′, normally closed contacts 1LS*a*, and said coil CHF.

It will be understood that other circuit means within the automatic control means 70 (not herein illustrated) may cause vertical movement of the elevator before, after or during the horizontal motion of the carrier, but this is not directly involved in the operation being explained. The lines 75 and 76 are open at the normally open contacts CHS–1, the line 84 is open at the normally open contacts CER–1, the lines 77 and 78 are open at the normally open contacts 2LS*a*, 2LS*a*′ (line 86), and CEL–1, the line 80 is open at the normally open contacts 1LS*b*, and the lines 81 and 82 are open at the normally open contacts CSR–1 and CSL–1. Therefore, only fast horizontal motion of the carrier is effected.

As hereinabove described, when the elevator 20 approaches the selected storage location, the limit switch 1LS is tripped thereby reversing its contacts, opening the normally closed contacts 1LS*a* to de-energize the relay CHF and closing the normally open contacts 1LS*b* and energizing the relay CHS. Alternatively, the carrier may be stopped upon de-energization of relay CHF as the carrier closely approaches the final stopping position, which relay CHS may be energized for the following sequence. This completes a circuit from the lead L1 through the normally closed contacts CER–2, normally closed contacts CEL–2, normally closed contacts 2LS*b* and 2LS*b*′, the now closed contacts 1LS*b*, and relay CHS to the lead L2. The carrier now drops to slow speed and at the same time the now energized relay CHS closes the normally open contacts CHS–1 in the line 75. If the contacts of selector switch 83 are in the position illustrated, a circuit is formed from the lead L1 through the now closed contacts CHS–1, the contacts 83*a*, an the solenoid relay coil CSR to the lead L2. It will be readily understood that if the selector contacts are reversed, then the circuit would go through the contacts 83*b* and the left-hand solenoid relay CSL.

Energization of the solenoid relay CSR in line 75 closes the normally open contact CSR–1 in the line 81. This results in the energization of the right-hand solenoid coil SR thereby causing the blade 59 to rotate to the actuating full line position of FIG. 4. If the selector switch 83 is set to energize the left-hand solenoid relay CSL, then the normally open contacts CSL–1 would close to energize the left-hand solenoid coil SL.

Continued movement of the carrier at slow speed, as hereinabove described, causes the blade 59 and the actuator plate 60 to pivot whereby the stop switch 2LS is tripped and the contacts thereof are reversed. This opens the normally closed contacts 2LS*b* thereby de-energizing the coil CHS to cause the carrier to stop its horizontal motion. At the same time, the contacts 2LS*a* of the stop switch close thereby energizing a circuit across the line 77 through said contacts 2LS*a*, selector switch contacts 83C and the extractor relay CER. De-energization of the slow horizontal motion relay CHS also causes the normally open contacts CHS–1 to open thereby isolating the solenoid relay coil CSR. With the relay CSR de-energized, the contacts CSR–1 open, the right-hand solenoid coil SR is de-energized, the armature portion 52 returns to its normal position, and the blade 59 drops downwardly both from the bias of said armature portion and the pull of gravity thereby allowing the stop switch 2LS to resume its normal position. However, the extractor coil CER is not thereby de-energized because the normally open contacts CER–1 in line 84 are now closed to effect a maintaining circuit across the line 84, through the contacts 83C, to the coil CER. If the selector switch is set for left-hand operation, then closing of the contacts 2LS*a* would form a circuit from the lead L1 through said contacts, through the crossover line 85, through the selectro contacts 83*d*, and through the coil CEL to the lead L2. The maintaining circuit for the relay CEL is directly across the line 78 which contains the normally open contacts CEL–1 controlled by the relay CEL.

With one of the extractor coils CER or CEL energized, the extractor proceeds with its lateral motion and a load is then lifted from a pair of ledge members or deposited thereon in the manner hereinabove described by control means provided within the automatic control means 70 but not shown herein in detail. If the automatic control means is set to resume horizontal forward motion of the carrier after the extractor motions are completed and the extractor has returned to the elevator 20, all contacts and circuits are now in condition to continue onwardly to a second selected load storage location.

A second embodiment of this device is shown in FIGS. 13 and 14 and is utilized in the warehouse rack structure already described.

In this case, a rotary solenoid 150 is attached by screws 151 to a suitable portion of the vertical carriage of the carrier, in this instance the same being shown mounted to the upstanding weldment 22 which has already been described. It will be noted in FIGS. 13 and 14 that the rotary solenoid and its attached limit switch 2LS′, are both positioned inside of the end 89 of the weldment 22 which extends toward the support means 8 adjacent that side of the aisle so that as the carrier moves up and down the aisle, if any obstruction lies in the path of the device herein described, only the actuator arm 59′ will be injured as all of the other parts are protected by the parts of the carrier. The limit switch 2LS′ is in all respects similar to and performs the same functions as, the limit switch 2LS already described. In a projection at the end of the limit switch nearest the storage racks, indicated at 92, there is mounted pivot means 56′ which is mounted for slight oscillation about its own axis in the projection 92. A block 93 is fixed to the pivot means 56′ to turn therewith and in this block is secured the actuator arm 59′ so that when this arm is moved from the full line position of FIG. 14, where limit switch 2LS′ is closed, to the broken line position of FIG. 14, the block 93 carries pivot pin 56′ in a clockwise direction as seen in FIG. 14 which moves an actuator (not shown) in the limit switch to open the switch as is later described.

Here, as in the first described embodiment, the actuator arm 59′ normally hangs vertically downward as shown in FIG. 13 as the carrier moves up and down the aisle. My above mentioned copending applications explain how the rough positioning device of the control means causes the carrier to slow down in its movement along the aisle as it approaches its final horizontal position. The initiation of this slower movement, energizes the rotary solenoid 150 causing it to turn about 90 degrees to swing the actuator arm 59′ from the full line position of FIG. 13 to the dot-dash position where the arm extends substantially horizontally and lies between the flanges 8*a* of two ledge members 8 on opposite sides of a vertical post 2 of the storage rack, which structure has been previously described. Further movement of the carrier along the aisle causes the actuator arm 59′ to be dragged against the lower flange 8*a* seen in FIG. 14 so as to move the actuator arm to the dotted line position and open the limit switch 2LS′. The broken line position of the parts 59′ and 8*a* in FIG. 14 show relative position only whereas it will be understood that it is the extractor portion 22 and the rotary solenoid and the limit switch which actually move relative to the rack ledge members 8.

The action of the limit switch 2LS' is in all respects like that shown in the diagram of FIG. 12 in the position of the limits switch 2LS.

Here, as in the first described embodiment, an end portion 94 of the actuator arm 59' extends in a generally vertical direction and is of sufficient vertical extent to engage the upstanding flange 8a of a ledge member when the relatieve position of the horizontal flange 9 is in the dot-dash position of FIG. 13 prior to deposit of a load by the extractor, or when the horizontal flange 9 is in the full line position of FIG. 13 when the extractor is prepared to pick up a load. Here again, the ledge members 8 do not move but FIG. 13 is drawn to indicate the relative position of the extractor and the ledge members in the high and low position of the extractor.

To protect the rotary solenoid and its associated limit switch, the parts are preferably housed in a cabinet 90 which is bolted to the weldment 22 by the members 91. This cabinet has a slot 95 opening away from the aisle so as to permit the swinging of the actuator arm 59' between its two positions as shown in FIG. 13.

The second embodiment, like the first, may stop the carrier as it approaches its final horizontal position and then initiate a slower movement of the carrier and energizing solenoid 150, followed by the sequence described above.

It will be understood that many changes in the details of the invention as herein described and illustrated may be made without, however, departing from the spirit thereof or the scope of the appended claims.

What is claimed is:

1. In a mechanized warehousing system with a storage frame having load support means disposed at different horizontal bay positions along an aisle and at different levels in said bay positions, a contact surface portion of predetermined vertical dimension disposed adjacent said aisle for each said load support means, a powered carrier movable along said aisle horizontally and vertically to a selected load support means, said carrier including a generally laterally extensible extractor movable into said storage frame at a lower level slightly below a selected support means to pick up a load and alternatively into said frame at a higher level slightly above a selected support means to deposit a load; control means for controlling the movement of said carrier and extractor, apparatus for precisely positioning said carrier at a selected bay position comprising a control element carried by the carrier and adapted, upon actuation thereof, to stop the horizontal motion of said carrier; movably mounted actuator arm means; power means for moving said arm means from an inactive position to an active position wherein subsequent movement of said arm means causes actuation of said control element and stopping of horizontal movement of said carrier and effecting lateral movement of said extractor to either deposit a load in said storage frame or pick up a load from said storage frame; said arm means being so disposed, in said active position, that a distal end thereof engages in abutting relation one of said surface portions and causes said subsequent movement of said arm means as said carrier makes a final approach movement to a selected load support means; and said distal end of said arm means in the active position of the latter being of sufficient vertical extent to engage one of said surface portions at both said higher and lower level positions of said extractor for entry into said storage frame.

2. In a mechanized warehousing system as set forth in claim 1; wherein said control means includes means responsive to said final approach movement for activating said power means and causing said actuator arm means to move from said inactive to said active position.

3. In a mechanized warehousing system as set forth in claim 1 including pivot means movably mounting said actuator arm means; said control element comprising an electric switch; said power means comprising a rotary solenoid, said pivot means being carried by said rotary solenoid; said control means including means responsive to said final approach movement causing energization of said rotary solenoid whereby said actuator arm means is rotated from said inactive to said active position.

4. In a mechanized warehousing system as set forth in claim 1; pivot means movably mounting said actuator arm means, said pivot means being rotatable by said power means about a horizontal axis from an inactive position, wherein said arm means hangs downwardly, to an active position, wherein said arm means is generally horizontal, whereby when said power means is deactivated, the weight of said arm means acts to help return said arm means to its inactive position.

5. In a mechanized warehousing system as set forth in claim 1 wherein said storage frame includes vertical posts disposed adjacent to said aisle and defining said bay positions; said load support means including ledge means carried on either side of said posts and projecting beyond said posts toward the path of said carriage along said aisle; each said load support means comprising a pair of said ledge means carried by adjacent of said posts; and said contact surface portion for each load support means comprising a surface portion of an adjacent ledge means, with said actuator arm means being adapted to be oriented intermediate the respective surface portions of the pair of adjacent ledge means in the active position of said arm means.

6. A mechanized warehousing system as defined in claim 1 wherein said control element is a switch directly connected to said actuator arm means.

7. A mechanized warehousing system as defined in claim 1 including pivot means rotatably mounting said actuator arm means, and wherein said power means is a rotary solenoid, said control element is an electric switch directly mounted on said solenoid, and said pivot means extends from said switch and is operatively connected therewith to actuate said switch by rotative movement of said actuator arm means about said pivot means.

8. A mechanized warehousing system as defined in claim 1 wherein said control element includes a switch spaced from said actuator arm means and an operative member for said switch, pivot means pivotally mounting said actuator arm means adjacent said operative member, said operative member being in a position engageable by said actuator arm means in said active position as said arm means pivots about said pivot means.

9. A mechanized warehousing system in accordance with claim 1 wherein said control means includes relay means controlling the actuation of said extractor, said relay means being operatively connectable to said control element for energization of said relay means upon actuation of said control element by said subsequent movement of said arm means.

10. A mechanized warehousing system in accordance with claim 9 wherein a storage frame having load support means is disposed on each side of said aisle, and including plural relay means for controlling entry of said extractor into one or the other of said storage frames, and selector switch means for coupling the selected of said relay means to said control element to control the direction of lateral extension of said extractor.

11. A mechanized warehousing system in accordance with claim 1 wherein said arm means is movable in a first plane by said power means from said inactive position to said active position, whereby said arm means is in position for said abutting engagement with one of said surface portions, and said arm means is movable in a second plane upon engagement of said arm means with said one surface portion for causing said subsequent movement of said arm means and resultant actuation of said control element, said planes being generally perpendicular with respect to one another.

12. A mechanized warehousing system in accordance with claim 8 wherein said power means comprises a rotary solenoid including an exposed armature portion, a yoke secured to said armature portion and projecting outwardly therefrom, a pin pivoted to said yoke and comprising said pivot means, said arm means being secured to said pin for pivotal movement therewith during said subsequent movement of said arm means, spring means coacting with said arm means for yieldingly resisting said subsequent movement of said arm means, and means coacting with said operative member for adjusting the position of said operative member with respect to said arm means.

References Cited

UNITED STATES PATENTS

| | | | |
|---|---|---|---|
| 1,709,102 | 4/1929 | Waite et al. | 214—16.1 X |
| 1,717,046 | 6/1929 | Lindquist et al. | 214—16.1 X |
| 3,228,540 | 1/1966 | Crile et al. | 214—16.4 |
| 3,283,924 | 11/1966 | Chasar | 214—16.4 |
| 3,323,661 | 6/1967 | Chasar | 214—16.4 |

GERALD M. FORLENZA, *Primary Examiner.*

R. J. SPAR, *Assistant Examiner.*